Figure 18:
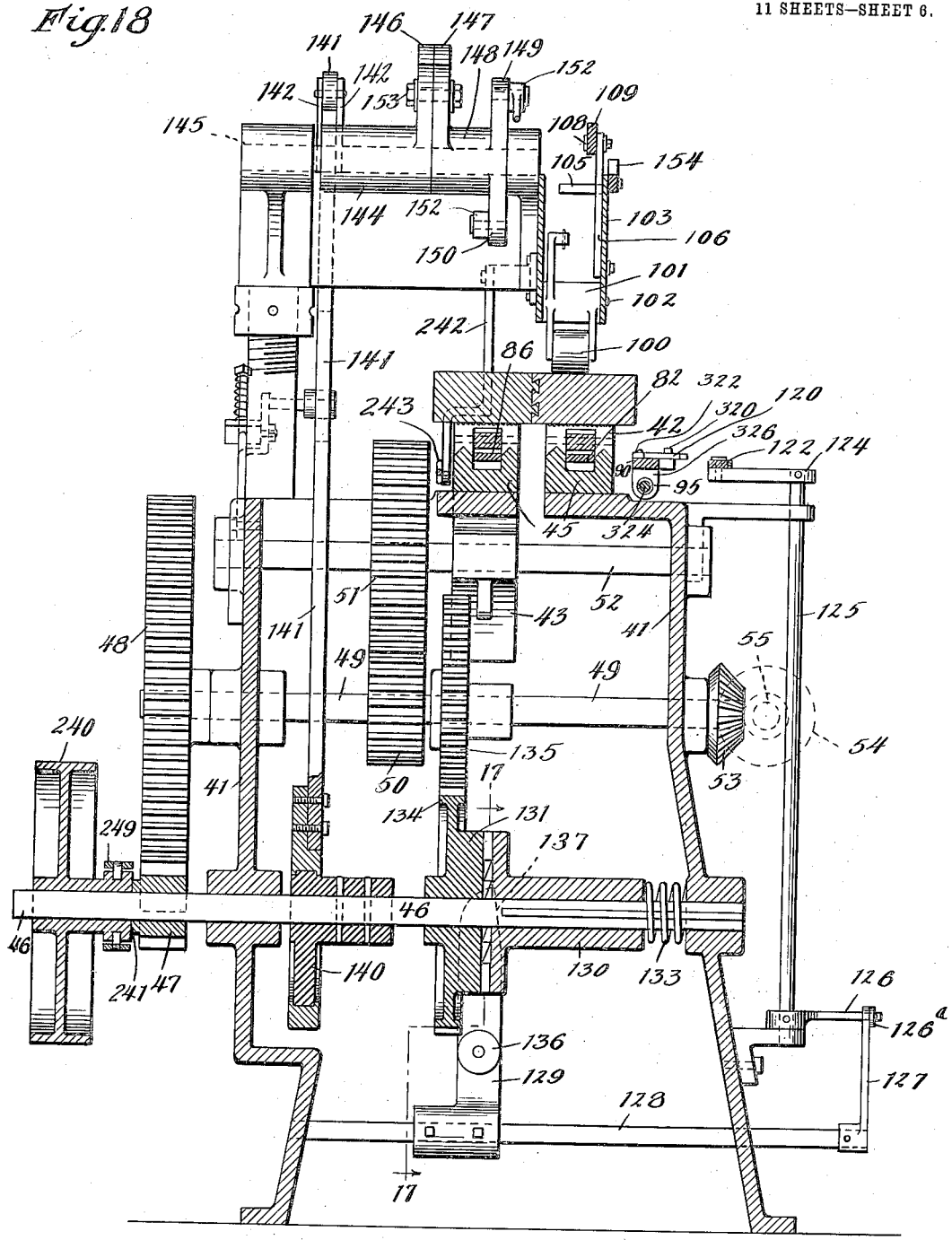

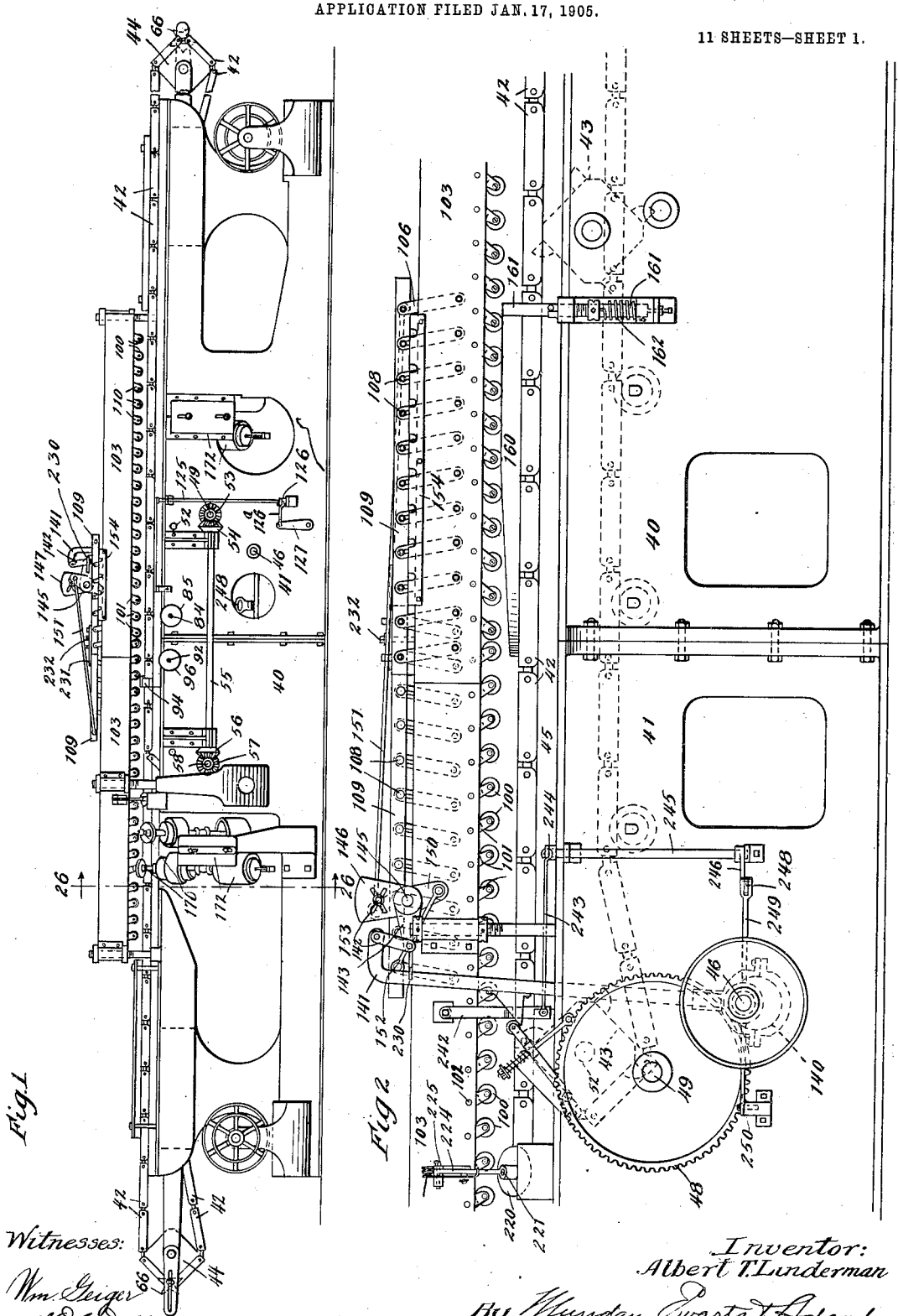

No. 827,738. PATENTED AUG. 7, 1906.
A. T. LINDERMAN.
LUMBER JOINING MACHINE.
APPLICATION FILED JAN. 17, 1905.
11 SHEETS—SHEET 2.
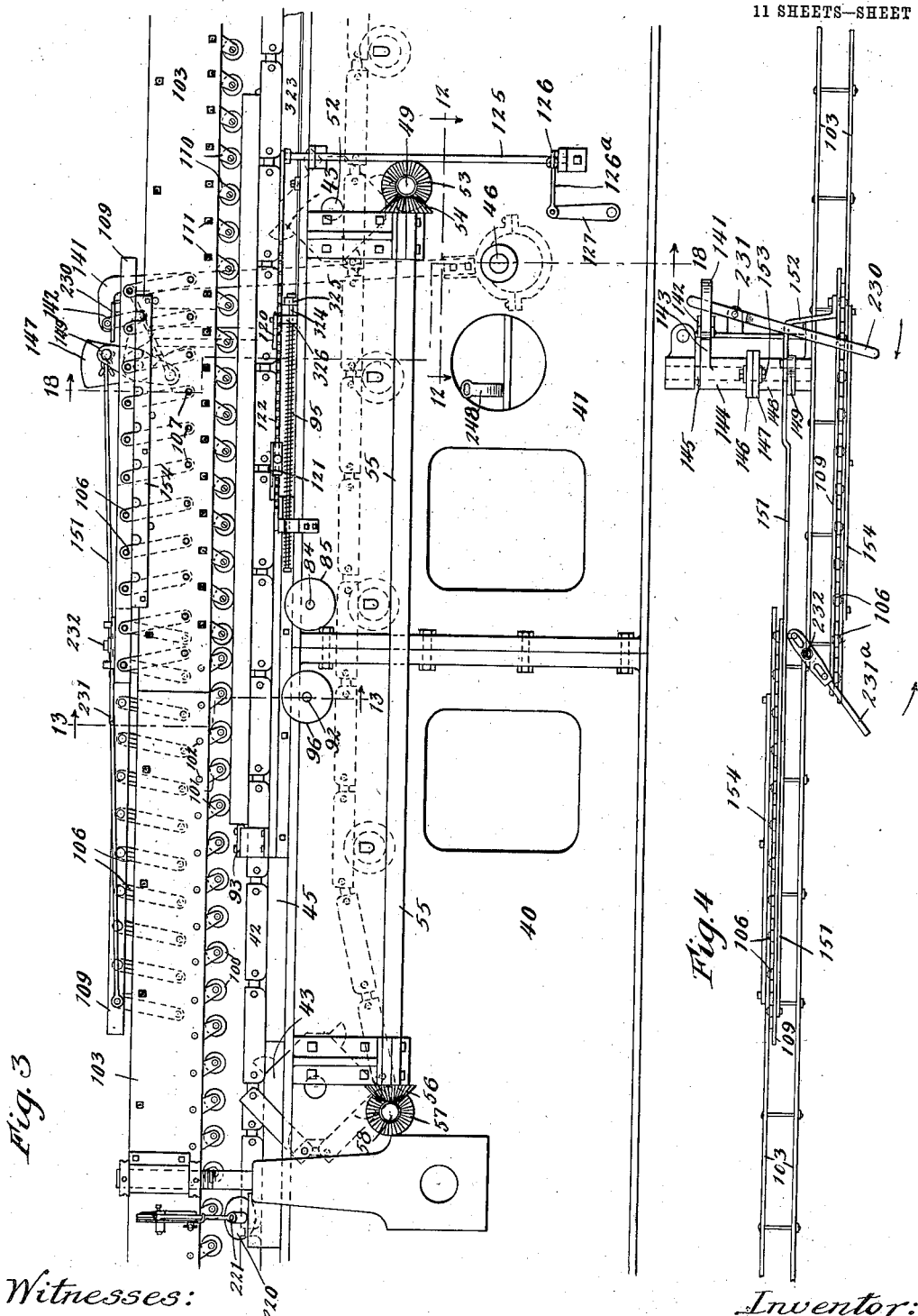
Witnesses:
Wm. Geiger
H. M. Munday
Inventor:
Albert T. Linderman
By Munday, Evarts & Adcock
Attorneys No. 827,738. PATENTED AUG. 7, 1906.
A. T. LINDERMAN.
LUMBER JOINING MACHINE.
APPLICATION FILED JAN. 17, 1905.
11 SHEETS—SHEET 3.
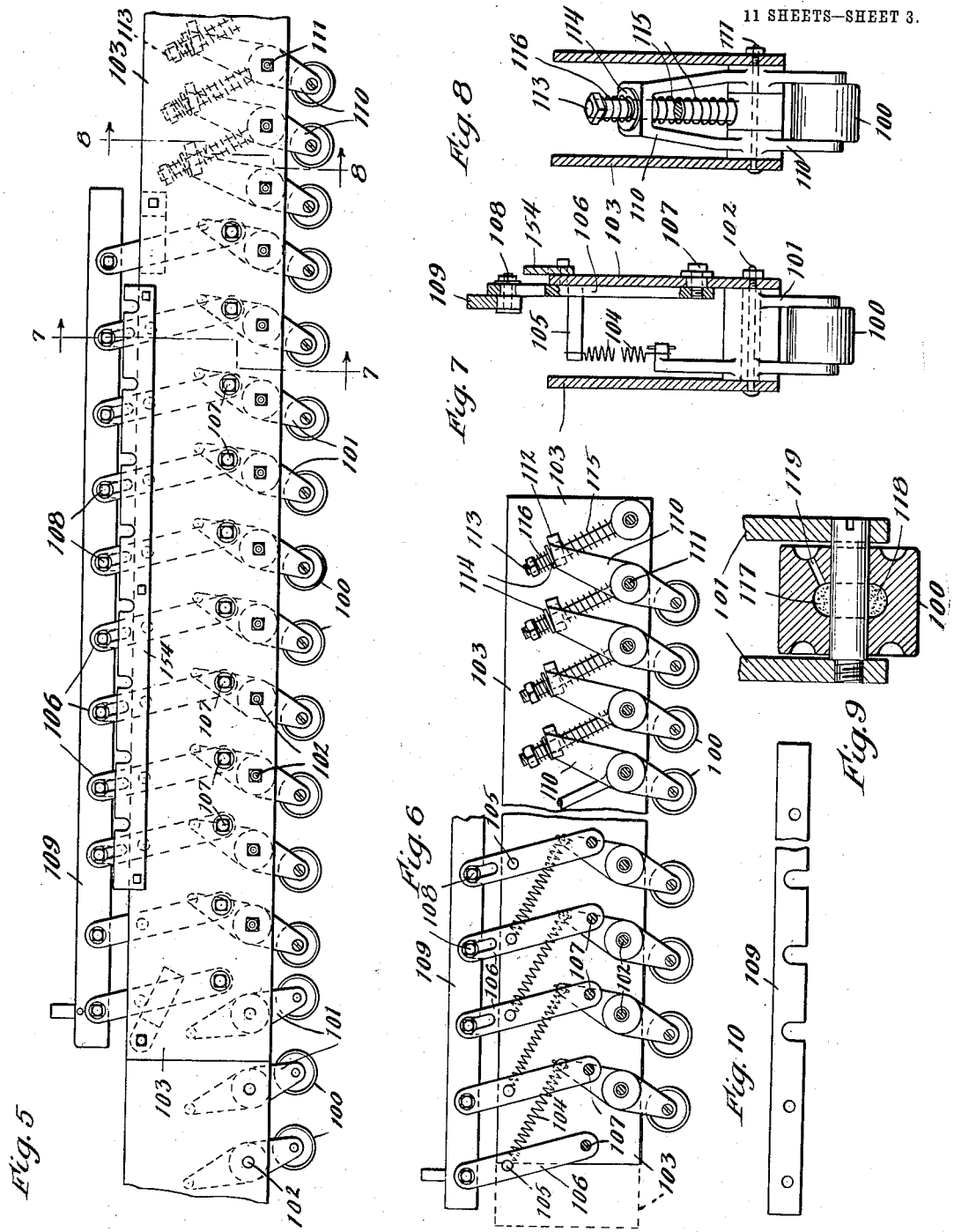
Witnesses:
Wm. Geiger
H. W. Munday
Inventor:
Albert T. Linderman
By Munday, Evarts & Adcock
Attorneys No. 827,738. PATENTED AUG. 7, 1906.
A. T. LINDERMAN.
LUMBER JOINING MACHINE.
APPLICATION FILED JAN. 17, 1905.
11 SHEETS—SHEET 4.
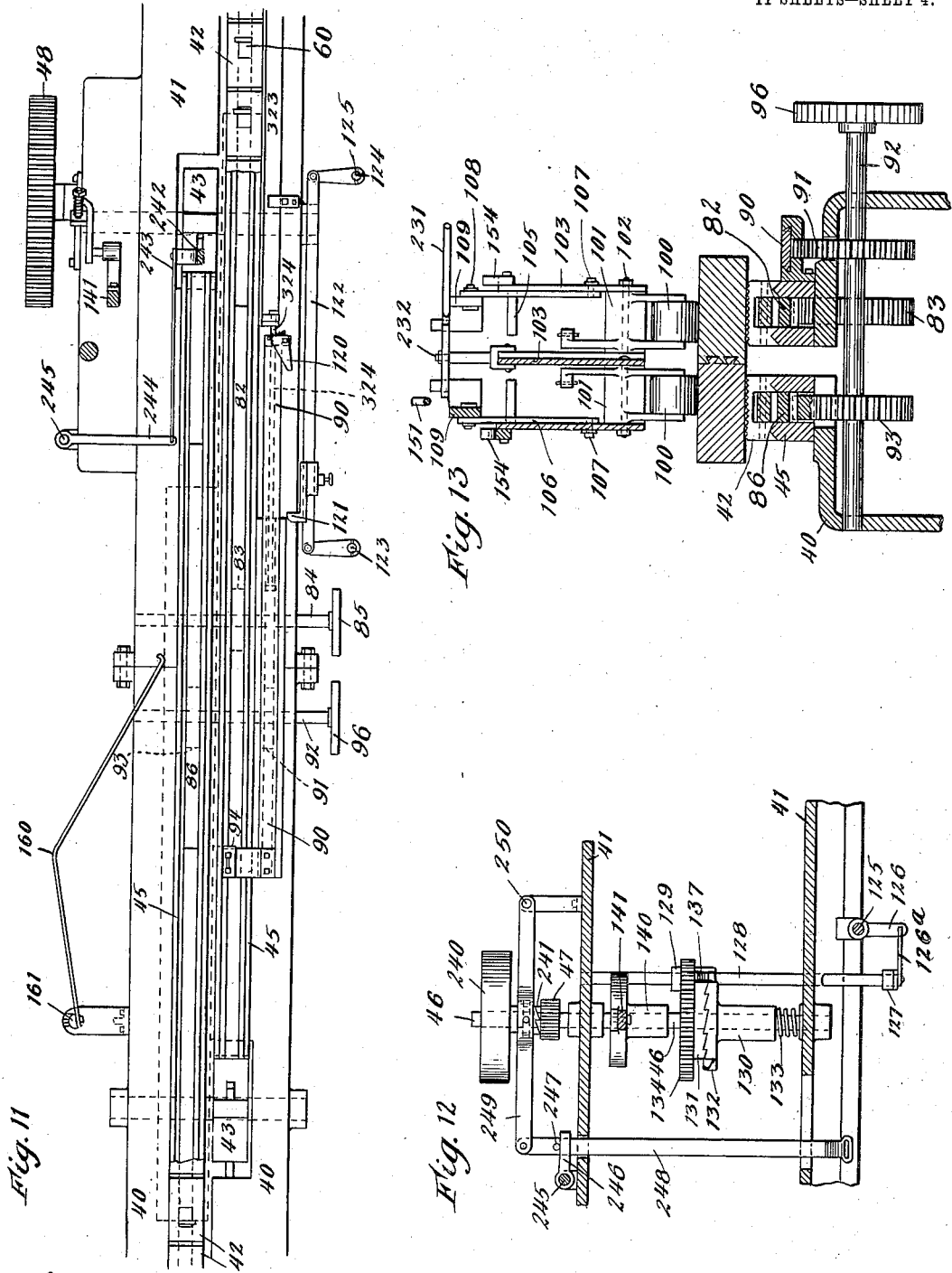
Witnesses:
Inventor:
Albert T. Linderman
Attorneys No. 827,738. PATENTED AUG. 7, 1906.
A. T. LINDERMAN.
LUMBER JOINING MACHINE.
APPLICATION FILED JAN. 17, 1905.
11 SHEETS—SHEET 5.
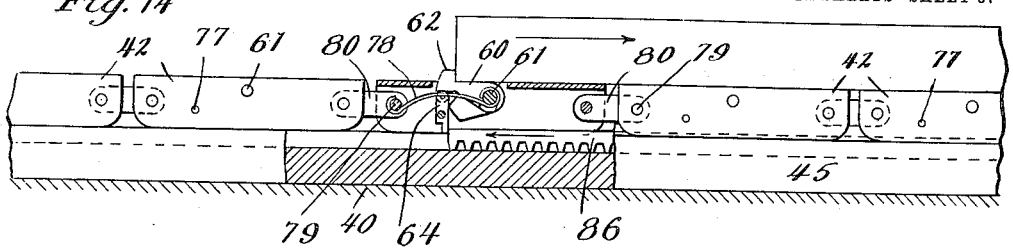
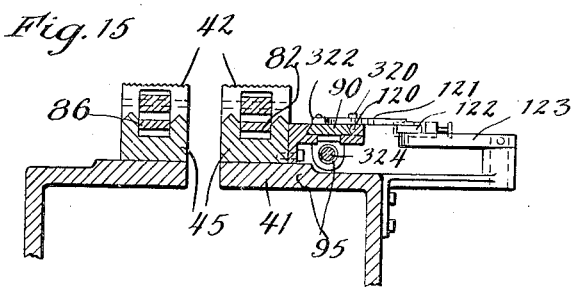
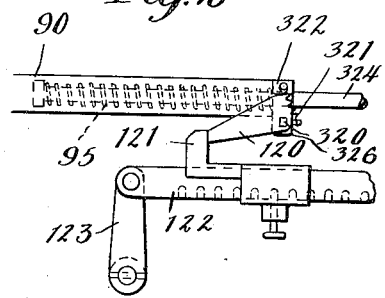
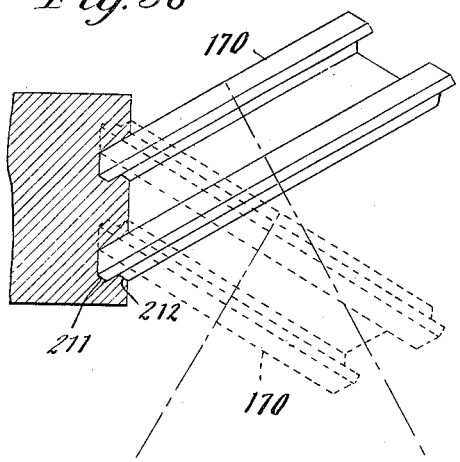
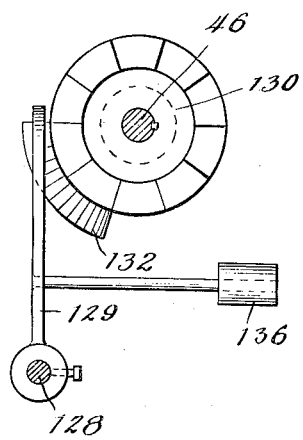
Witnesses:
Wm. Geiger
H. M. Munday
Inventor:
Albert T. Linderman
By Munday, Evarts & Adcock,
Attorneys No. 827,738. PATENTED AUG. 7, 1906.
A. T. LINDERMAN.
LUMBER JOINING MACHINE.
APPLICATION FILED JAN. 17, 1905.

11 SHEETS—SHEET 6.

Witnesses:
Wm. Geiger
H. W. Munday

Inventor:
Albert T Linderman
By Munday, Evarts & Adcock,
Attorneys

No. 827,738. PATENTED AUG. 7, 1906.
A. T. LINDERMAN.
LUMBER JOINING MACHINE.
APPLICATION FILED JAN. 17, 1905.
11 SHEETS—SHEET 7.
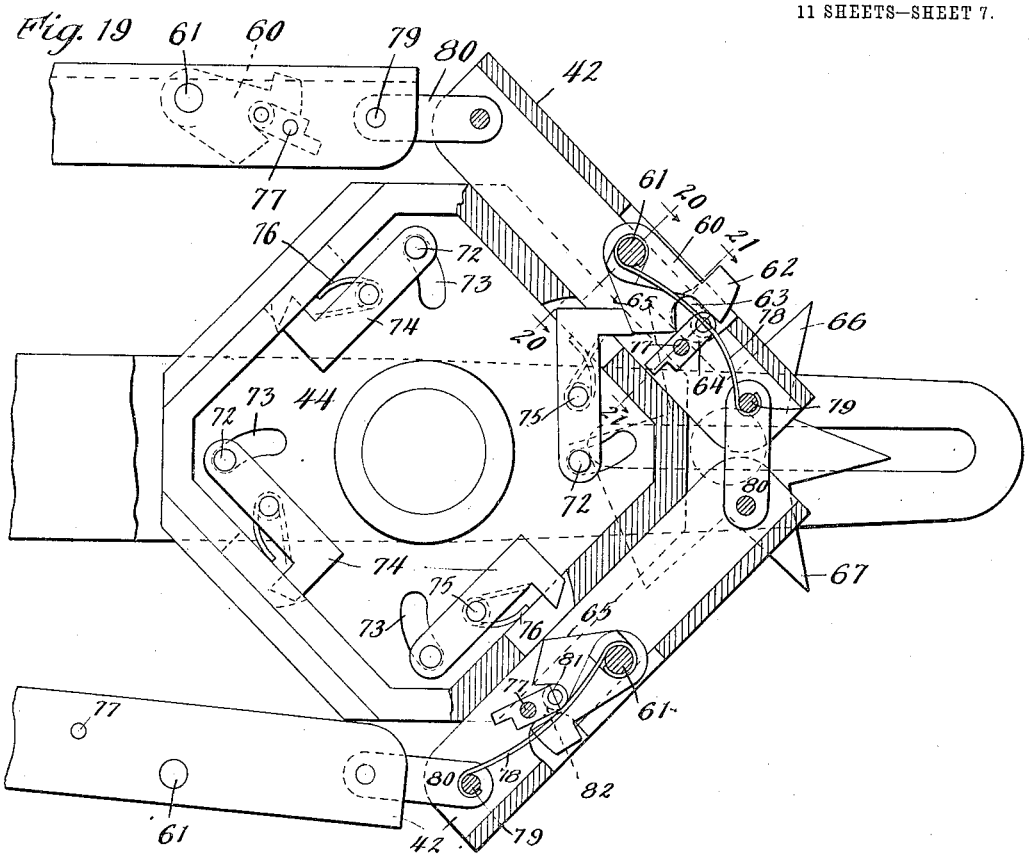
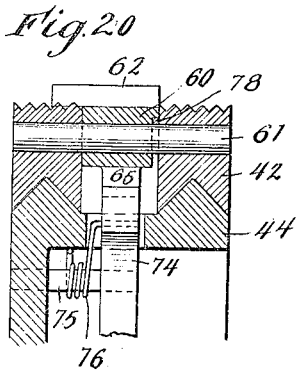
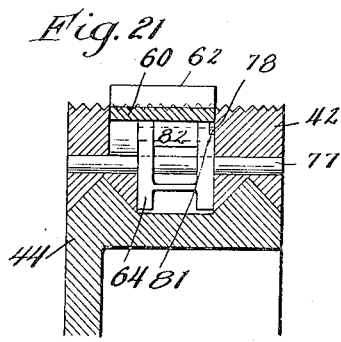
Witnesses:
Wm. Geiger
H. W. Munday
Inventor:
Albert T. Linderman
By Munday, Evarts & Adcock,
Attorneys No. 827,738. PATENTED AUG. 7, 1906.
A. T. LINDERMAN.
LUMBER JOINING MACHINE.
APPLICATION FILED JAN. 17, 1905.
11 SHEETS—SHEET 8.
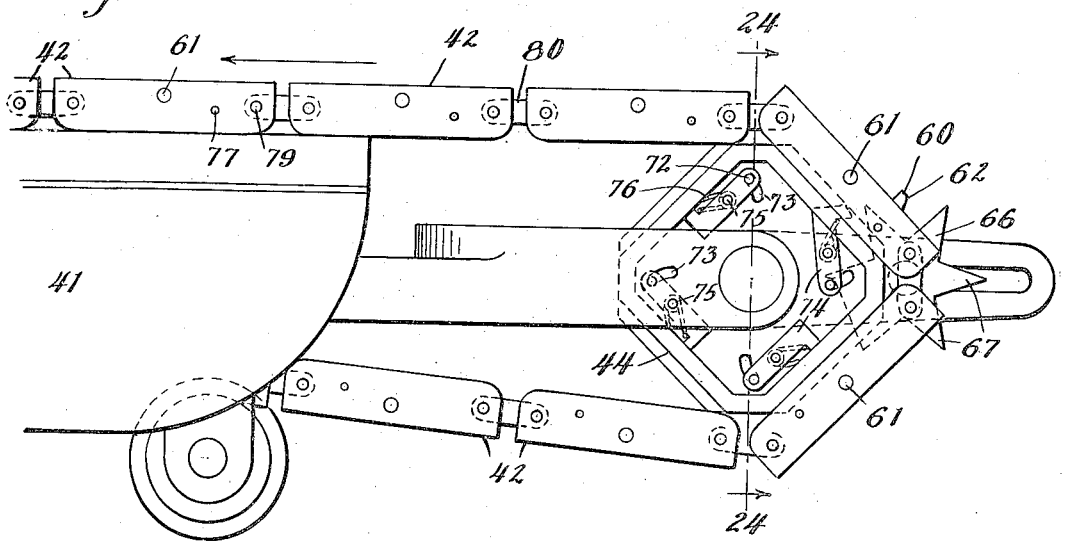
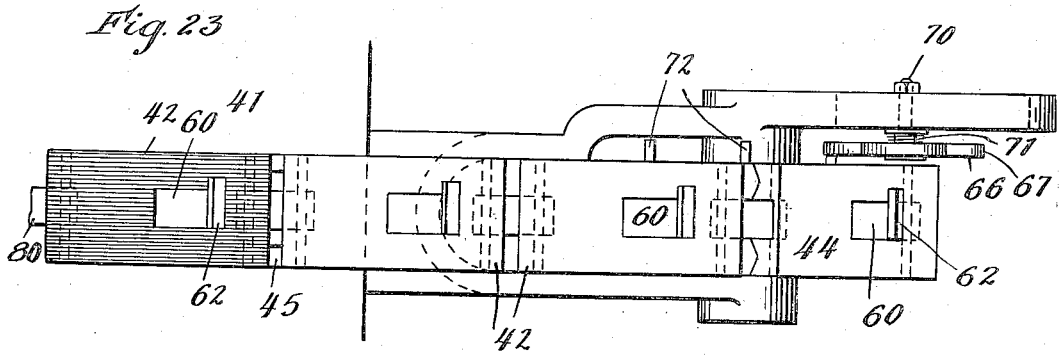
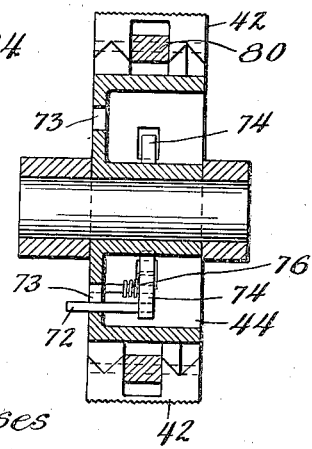
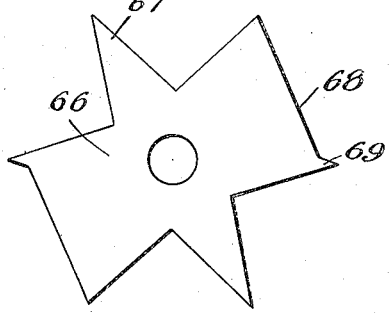
Witnesses
Wm. Geiger
H. W. Munday
Inventor:
Albert T. Linderman
By Munday, Evarts & Adcock.
Attorneys

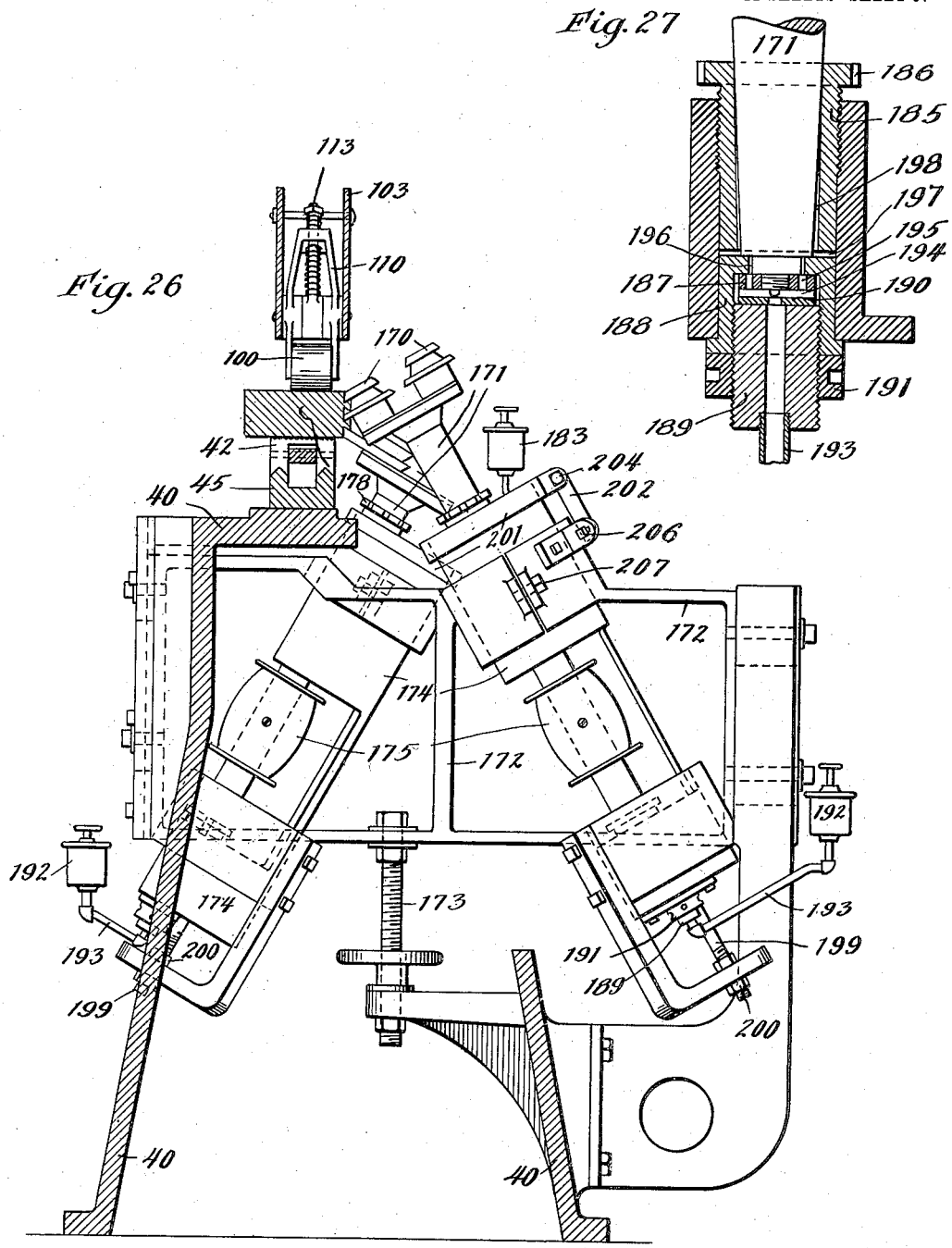

No. 827,738. PATENTED AUG. 7, 1906.
A. T. LINDERMAN.
LUMBER JOINING MACHINE.
APPLICATION FILED JAN. 17, 1905.
11 SHEETS—SHEET 10.
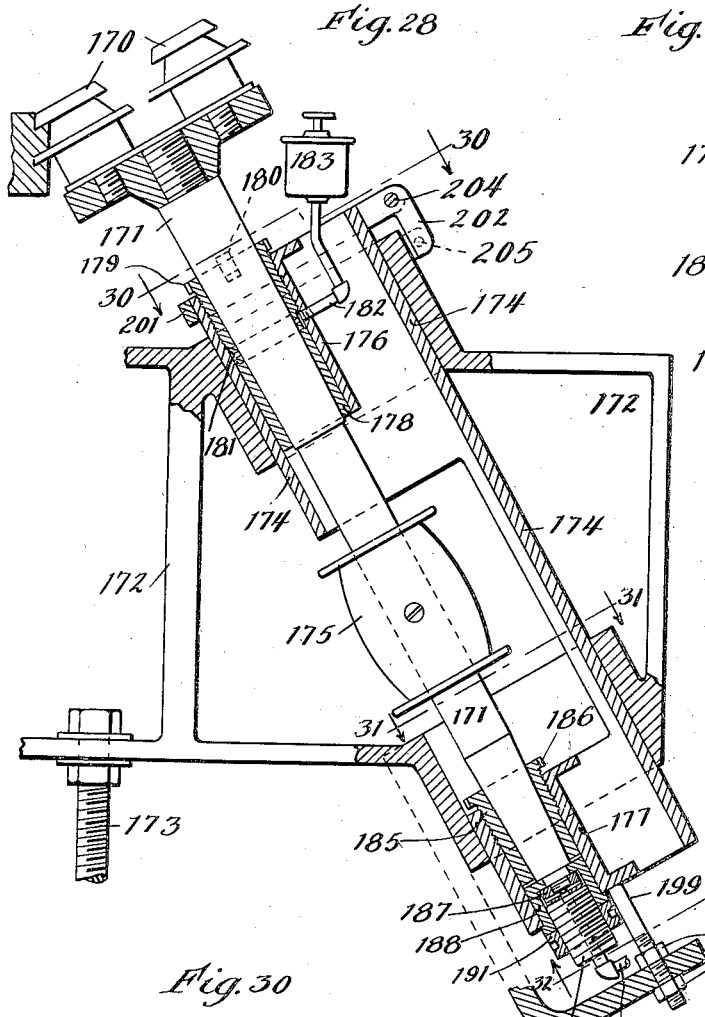
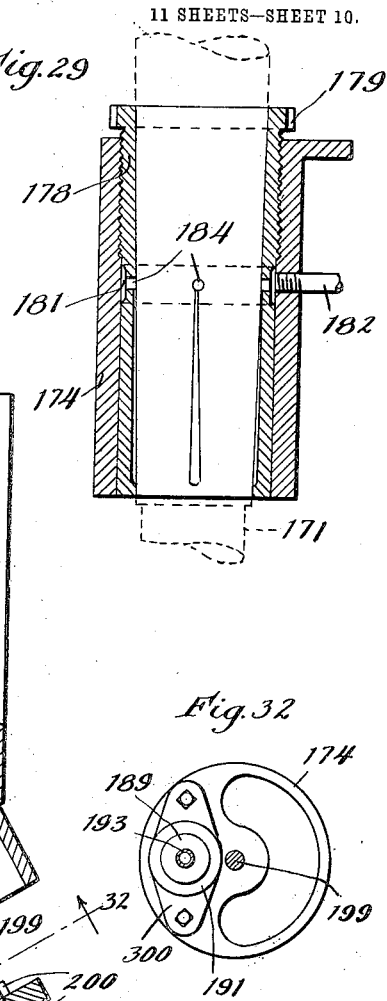
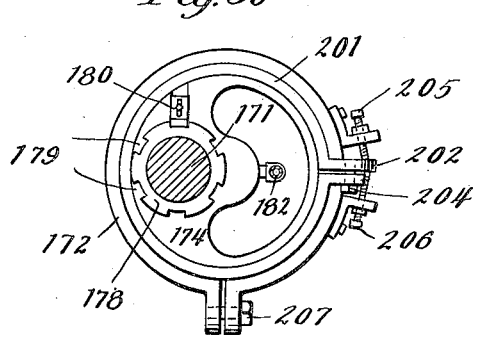
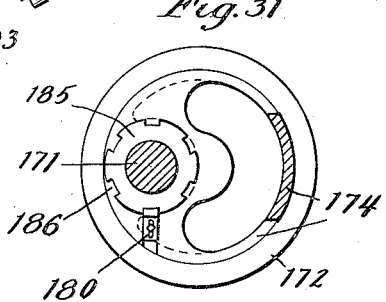
Witnesses:
Wm. Geiger
H. M. Munday
Inventor:
Albert T. Linderman
By Munday, Evarts & Adcock,
Attorneys No. 827,738. PATENTED AUG. 7, 1906.
A. T. LINDERMAN.
LUMBER JOINING MACHINE.
APPLICATION FILED JAN. 17, 1905.

11 SHEETS—SHEET 11.

Witnesses:
Wm. Geiger
H. W. Munday

Inventor:
Albert T. Linderman
By Munday, Evarts & Adcock,
Attorneys

UNITED STATES PATENT OFFICE.

ALBERT T. LINDERMAN, OF WHITEHALL, MICHIGAN.

LUMBER-JOINING MACHINE.

No. 827,738.　　　Specification of Letters Patent.　　　Patented Aug. 7, 1906.

Application filed January 17, 1905. Serial No. 241,498.

*To all whom it may concern:*

Be it known that I, ALBERT T. LINDERMAN, a citizen of the United States, residing in Whitehall, in the county of Muskegon and State of Michigan, have invented a new and useful Improvement in Lumber-Joining Machines, of which the following is a specification.

In Patent No. 661,542, granted to me on the 13th day of November, 1900, I show a machine embodying two sets of cutters for forming interfitting dovetails on the surfaces of two pieces of lumber and means for bringing said pieces together endwise with the dovetails in alinement, so that the dovetails may then be forced into engagement. The means for feeding the lumber past the cutters and into engagement with each other consisted of two endless carriers which are alike in their construction, but which move in opposite directions in adjacent planes, some portion of each carrier overlapping or being extended abreast of a portion of the other carrier. The links of the carriers in the first machines built under the patent were made quite long—some twenty-four inches—and each link was provided with a pushing-dog for pushing the lumber along, such dogs being normally kept raised in acting position by springs and being further adapted to recede below the surface of the links whenever the lumber was so placed as to bear downward upon them. In machines of this character it is desirable that the intervals or open spaces upon the carriers between successive pieces of stock shall be as short as possible in order that the procession of the pieces to be joined shall be practically continuous and no time be lost unnecessarily between the cutting operations or the joining operations. It is also desirable that the intervals referred to be of uniform length, so that in cases where the stock is placed upon the carrier by hand the operator will be less apt to make mistakes than he would be if the intervals varied. The patented construction did not accomplish these results as perfectly as I desired, and hence I have been led to make the present invention, in which instead of making the links long I now make them quite short—some eight inches—and increase their number accordingly, and instead of the normally raised dogs of the patent I now employ normally depressed dogs in conjunction with means for each carrier whereby such of the dogs as are required to operate, and such only, may be raised at the proper times to engage and feed the stock. The selecting means may raise all the dogs or every second or third or fourth dog, leaving the intervening ones depressed and inactive, and do not raise any one dog in successive rounds or cycles of the carrier unless that dog happens to be the one desired. It is also immaterial whether or not the chain embodies a number of links which is a multiple of the number of links required to support a single piece of the stock. With this construction there need be only short intervals between the successive pieces upon the carriers, those intervals will be uniform, and the machine is readily changed so as to operate on different lengths of lumber by merely changing the selecting means, no change whatever being required in the carriers.

Another object which I have in view in the present invention is the providing of means for withdrawing the dogs from action at the instant when they have brought the ends of the two pieces of lumber to the same transverse plane, or, in other words, when the said ends of the two pieces are exactly even with or abreast of one another, so that in the subsequent working up of the united board there will be no waste at the ends.

The invention also embraces means for automatically releasing the presser-rollers in the center of the machine when the boards have been joined, as stated, with their ends even with one another, also means for rendering such rollers active or inactive, according to the length of the stock or number being worked, also improved means for the easy and accurate maintenance of the proper relations between the cutters and the stock and the lubrication of the arbors carrying the cutters, also improved means for automatically ejecting the finished stock from the machine, also means for causing the release of the finished stock from the machine in case of accident, also means for regulating the feeding of the stock relative to its straight or crooked edges, also an improved construction of the means for applying the glue to the stock, also means for adjusting the cutters acting upon the same piece of lumber both independently and unitedly, also an improved construction of the cutters and means for automatically stopping the carriers in case one of the pieces of lumber should fail to be fed.

Figure 33:
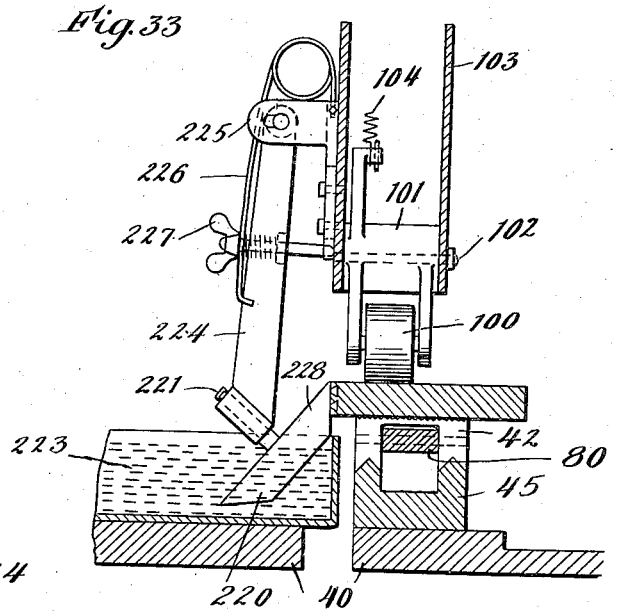
Figure 34:
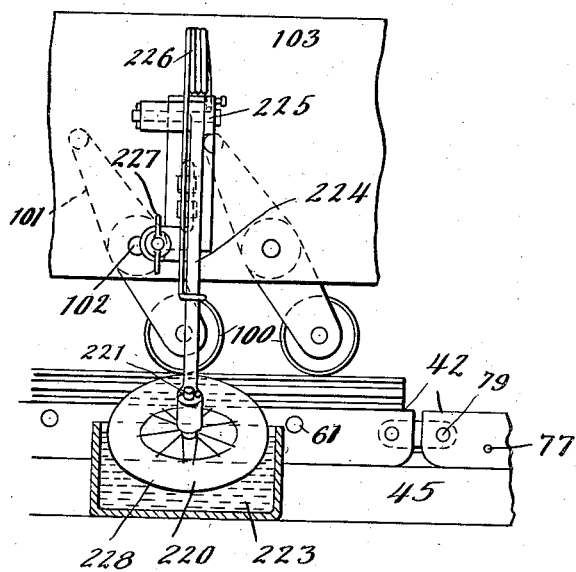
Figure 35:
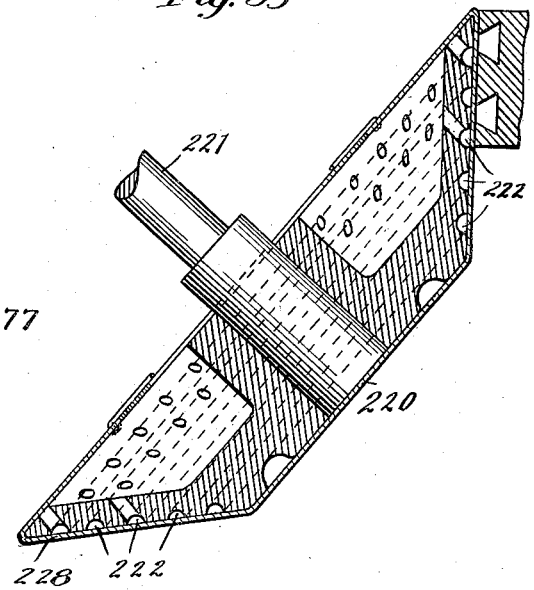

In the accompanying drawings, forming a part hereof, Figure 1 is a side elevation of the machine such as I have manufactured for the uniting of stuff three feet long, this being one of the smaller and more compact machines and the drawing being upon a small scale in order that it may all be shown in the single figure. Figs. 2 and 3 are enlarged elevations of the opposite sides of one of the larger machines. Fig. 4 is a plan of the portion of the machine shown in Fig. 3. Fig. 5 is a detail of a portion of the presser-roller mechanism. Fig. 6 is a partial longitudinal section of said mechanism. Figs. 7, 8, and 9 are detail sectional views of the presser-rollers, and Fig. 10 is a detached view of a portion of the mechanism. Fig. 11 is a partial horizontal section. Figs. 12 and 13 are sections on the lines 12 12 and 13 13, respectively, of Fig. 3. Fig. 14 is a partial elevation of one of the carriers and its supporting-ways, partly broken away. Fig. 15 is a transverse vertical section showing both carriers. Fig. 16 is a detail plan of the trip mechanism. Fig. 17 is a section on the line 17 17 of Fig. 18. Fig. 18 is a transverse vertical section on the broken line 18 18 of Fig. 3. Fig. 19 is a partial longitudinal elevation of one of the carriers, partly in section, and one of its supporting-wheels. Figs. 20 and 21 are sections on the lines 20 20 and 21 21, respectively, of Fig. 19. Fig. 22 is a partial elevation of one of the carriers, showing its connection to the machine. Fig. 23 is a plan view of the same. Fig. 24 is a section on the line 24 24 of Fig. 22. Fig. 25 shows one of the forms of star-wheels employed for setting the dogs. Fig. 26 is a transverse vertical section on the line 26 26 of Fig. 1. Fig. 27 is a detail of the lower bearing of one of the cutters. Fig. 28 is a vertical section of one of the cutter-arbors and its support. Fig. 29 is an enlarged detail of the upper bearing of the arbor. Figs. 30, 31, and 32 are sections upon the lines 30 30, 31 31, and 32 32, respectively, of Fig. 28. Fig. 33 is a vertical section of the glue-applying mechanism. Fig. 34 is a side elevation with the glue-pot in section. Fig. 35 is an enlarged detail of the glue-applying wheel or roller. Fig. 36 is an enlarged detail vertical section of the two cutters acting on the same board, one being shown in dotted lines.

In said drawings, 40 and 41 represent two frames, each supporting one of the carriers and arranged in parallel adjacent planes with their proximate ends overlapping, so that the carriers may be enabled to carry the lumber one piece upon each into engagement. These carriers are endless and composed of carriages or sections 42, preferably about eight inches in length, linked together and driven by four-sided wheels 43 at the inner ends of the supporting-frames and passing over similar non-driving wheels 44 at the outer ends of the frames. Between the wheels the upper course of the carriers is supported by and slides along stationary ways 45, each of which is provided with two V-shaped longitudinal ribs or guides fitting grooves formed in the under surface of the carriages, Figs. 13 and 18, while the lower course passes over idlers, as shown at Fig. 3. One of the driving-wheels 43 is actuated from the drive-pulley 240 of the machine by the pinion 47, gear 48, shaft 49, gears 50 and 51, and shaft 52, supporting said wheel 43, and power is carried from shaft 49 to the other wheel 43 by bevel-pinion 53 on shaft 49, pinion 54, meshing with pinion 53, longitudinal shaft 55, carrying pinion 54, bevel-pinion 56, also on said shaft, bevel-pinion 57, meshing with pinion 56 on cross-shaft 58, and gears not shown, but corresponding to gears 50 and 51 for carrying power from shaft 58 to the shaft of said wheel 43. These carriers are adapted to carry the stock past the cutters by which the dovetails are cut in it, but also by their continued movement to unite the dovetailed pieces. They are arranged in parallel adjacent planes, with their inner ends extended beyond or abreast of each other, and to adapt them to thus feed the stock each carriage in them is provided with its own individual pushing-dog 60, the construction whereof and of their positioning and selecting devices is best shown at Figs. 19 to 25.

The dogs are pivoted on cross-pivots 61, and each is provided with the following features, viz: a projection 62, serving to engage and push the stock, a recess 63 below the pusher 62, adapted to receive a swinging locking device 64, and a cam-surface 65, adapted to swing the dog on its pivot 61, and thereby position it in its acting position. The selecting of the dog to be raised is accomplished as follows: Adjacent to each wheel 44 is a wheel 66, which I call a "star-wheel" and by which the selecting is done. It is provided with such number of arms 67 and 68 as desired, the arms 67 being pointed and the arms 68 being provided with broad outer ends, at one side of which are projecting points 69. These arms 67 and 68 are all adapted to engage with pins 72, projecting laterally from the wheel 44 as the latter moves past the star-wheel, and this engagement causes the turning of the star-wheel a regulated distance at each actuation, so that each of the arms positions the star-wheel for engagement with the next succeeding arm, the star-wheel being pivoted on stub-shaft 70 and being restrained from overfree rotation by a friction-spring 71. The star-wheel arms 67 have no effect on such of the pins 72 as are encountered by them; but the arms 68, of which there may be one, as in Fig. 22, or a plurality, as in Fig. 25, according as the stock being operated upon is long or short, are different, and the pins which they engage ride upon and along the broad outer faces of the arms, so that the pins are forced from one end of the arc-slots 73 in the web of wheel 44, through which the pins project, to the other end thereof. The pins are rigidly inserted in the ends of L-shaped lifters 74, of which there is one for each side or carriage-space of the wheel 44, and which are pivoted to the wheel at 75 and are each provided with a spring 76, whose tension tends to hold the lifter in its non-acting position. In the change of position of these lifters, due to the moving of their pins 72 from one end of the arc-slots to the other, their outer ends, which are beveled, as shown, bear upon the cam-surface 65 of the dog, which is then positioned in operative relation to the lifter and force the dog from its non-acting position shown in the case of the lower dog in Fig. 19 to its acting position shown in the case of the upper one in full lines in the same figure. The lifter is retracted by its spring as soon as its pin has freed itself from the point 69 of the arm 68 of the star-wheel, and the star-wheel is positioned by the said pin as it passes point 69 in readiness to engage the pin next in order. When the dogs are thus moved into acting position, the locking devices 64, with one of which each is provided, are carried from the inclined position shown in the case of the lower dog to the vertical or radial position shown in the case of the upper dog, so that its outer end sets directly under the pusher 62 and sustains any downward pressure coming on the pusher from the stock. The locking devices swing on their pivots 77 and are controlled in the change described by the dogs and when thus positioned are retained by springs 78, one end of which is secured on the pivots 61 of the dogs and has its other end secured on pivots 79, by which the connecting-links 80 of the carriers are secured to the carriages. These springs are angular and bear at their centers upon the locking devices, and the upper ends of the locking devices are offset to give it a bearing, as seen at 81. Figs. 19 and 21. The locking devices may also be provided with rollers 82 at their ends to facilitate their movements.

The dog raised into acting position by the means described is now in readiness to push a piece of the stock past the cutters and into engagement with a like piece presented by the other carrier. Simultaneously with the completion of the joining operation the dog is withdrawn from action and receded into its carriage, as now to be described. Below the carriers are racks 82 and 86, so positioned in the bottom of the carrier-ways that their ends encounter such of the locking devices 64 of the carriers as may be in their acting position when the locking devices reach the proper point in their travel for the withdrawal of the pushing force from the stock. When thus tripped, the locking devices are forced back into their inclined positions and their roller ends enter the recesses in the dogs and assisted by the springs 78 they force the dogs inward, so that the pushers are taken out of their sphere of action and the feed of the lumber ceases. The rack 82 is adjustable longitudinally, so that it may operate sooner or later, as the length of the stock requires, the adjustments being effected by the gear 83, shaft 84, and hand-wheel 85. The adjustments are made whenever a change occurs in the length of the stock, the rack being stationary when in operation.

Both carriers have the same normally depressed dogs, the same selecting devices, the same locking devices 64, and the same lifters; but the other tripping-rack (shown at 86) is movable instead of stationary and is controlled as to the time it operates by the stock upon the carrier controlled by rack 82 for reasons which will appear in the next paragraph.

In the use of the patented machine it was found that the ends of the stock when joined were not always even with each other, and consequently some trimming of one or the other of the united boards was necessary to make them even. To avoid this, I have devised means whereby the stock itself upon one carrier is made to control the tripping of the dogs of the other or second carrier. These means are the following: At one side of the machine is a longitudinally-movable rack-bar 90, having its rack-teeth formed on its under surface and meshing with a gear 91 on a cross-shaft 92, carrying a second gear 93, meshing with the above-mentioned rack 86 of the second carrier. The rack-bars 86 and 90 are thus compelled to move in unison. Attached to one end of rack-bar 90 is an arm 94, which I call the "feeler," extending over the first carrier, whose tripping rack-bar 82 is stationary, and into position where it will be caught by the stock on said carrier and carried along with it during the latter portion of the stock's travel and until the dog pushing that stock is tripped by rack 82. As soon as the pushing force is thus removed the stock stops moving, and consequently the rack-bar 90 also stops, thereby stopping the rack-bar 86 and causing it to trip the dog of the second carrier which was feeding the other piece of the stock. I find it desirable that the dogs of one carrier should be tripped slightly in advance of those of the other; but when properly adjusted there is no difficulty in uniting the lumber with the advance end of each piece exactly even with the rear end of the other, so that no trimming of that end of the composite board will be necessary if the stuff is of uniform length. The rack-bar 90 is provided with a spring 95, Fig. 3, which is compressed by the movement described and which returns it to its normal position as soon as the stock by which it has been moved has been ejected from the machine, as described later on. A hand-wheel 96 is also provided on the shaft 92, whereby the rack-bars 90 and 86 may be adjusted. As the rack-bar 86 and the dog upon which it operates move in opposite directions, as seen at Fig. 14, it will be seen that the dog must be tripped the instant the rack encounters the locking device 64.

The machine is also provided with pressure devices for keeping the lumber flat upon the carrier, and such of the devices as bear upon it while it is being united are adapted to release their pressure at each operation to permit the ejection of the united board. The construction of the pressers is best shown at Figs. 5 to 9. Each of the releasable pressers embodies a roller 100, bearing upon the stock, and a swinging frame 101, supporting the roller and itself pivoted on a pivot 102, the ends of which are let into plates 103 at each side of the frame, each pair of the plates 103 serving all the pressers of one of the carriers. The frames 101 of the carriers are normally inclined, those of one carrier in one direction and those of the other carrier in the opposite direction, and a spring 104 extends from the upper end of each to a pin 105, let into a lever 106, located over an adjacent frame and pivoted at 107 to one of the side plates 103, as particularly shown at Figs. 6 and 7. The tension of the springs 104 tends to force the rollers down upon the stock. The levers 106, except those at the ends, are slotted at their upper ends, and through the slots project bolts 108, secured in a horizontal bar 109. There are two of these bars, one for the pressers of each carrier, and through them the rollers are raised from the stock, automatic longitudinal movements being given them for this purpose, as hereinafter described, whereby the levers 106 are reversed from their normal positions, thereby relieving the tension of the springs 104, so that the rollers if not actually raised do not press the stock objectionably or interfere with the ejection of the united board. Pressers are also provided over each carrier with which to hold the stock down while the dovetails are being cut in it. These pressers are located over the outer ends of the carriers, as shown at Figs. 1 and 3, and their construction is shown at Figs. 6 and 8. They each embody rollers 100, similar to those of the releasable pressers, and frames 110, supporting the rollers. The frames 110 are pivoted on pivots 111, supported in the plates 103, and are extended above the pivots, where they carry heads 112, through which project studs 113, integral with collars 114, mounted on the pivots 111 of the next adjacent pressers. The frames 110 are inclined in one direction and the studs in the opposite direction, as plainly seen at Fig. 6, and springs 115 encircle the studs below the heads and exert such pressure as tends to hold the pressers down on the stock. Other but lighter springs 116 are mounted on the studs above the heads to cushion the movement occurring when the rollers drop off the stock. All the rollers 100 have central recesses 117 surrounding their pivots, and these recesses are filled with packing 118, adapted to absorb a lubricant which is fed in through the passage 119.

The means for causing the release of the central pressers are the following: Attached to the rack-bar 90 already described is a laterally-projecting arm 120. When the rack-bar nears the end of the stroke which it receives from the stock, this arm encounters a stop 121, adjustably secured to a rod 122, arranged at the side of the bar and mounted upon the ends of two horizontally-extending cranks 123 and 124. Of these cranks the one marked 124 is mounted on and actuates a vertical shaft 125, the lower end of which carries an arm 126, connected by a link 126$^a$ to crank-arm 127 on a horizontal shaft 128. Upon shaft 128 is an upwardly-extending arm 129, the construction of which appears in Figs. 17 and 18 and whose main purpose is to normally hold the sliding part 130 of a clutch from engaging with the non-sliding part 131. The arm 129 is enabled to do this by its contact with a wedge-shaped segmental cam 132, mounted on the part 130. The clutch composed of the parts 130 and 131 is mounted on the main drive-shaft 46, which turns only when actuated by it, the part 130 being keyed to the shaft and the part 131 being loose. The spring 133 presses the sliding member into engagement with the non-sliding one and closes the clutch whenever allowed to do so by the arm 129. The non-sliding clutch member also carries a gear 134, which is in constant motion by reason of its meshing with gear 135 on shaft 49. With this construction it will be seen that the rack-bar 90 will carry rod 122 along with it until the cranks 123 and 124 have deflected the rod far enough to let the stop 121 escape from the arm 120. In the movement thus given to the rod the shaft 125 will have been turned so as to rock shaft 128, thereby carrying arm 129 away from its acting position and allowing the closing of the clutch, with the result that movement is imparted to the shaft 46. This movement of the main shaft is limited to a single revolution, however, because the arm 129 is provided with a returning-weight 136, which as soon as the stop 121 has cleared the arm 120 brings said arm and the rod 122 and all the intervening parts back to their normal positions, so that the cam 132, which meanwhile is moving with the clutch, will when it reaches the arm 129 enter its thin edge into the open space formed between its carrying clutch member and the bevel edge 137 of said arm and by its continued movement therein gradually push back the member 130 and effect the opening of the clutch. The rotation of the clutch member 130 thus ceases before the cam has passed the arm, and consequently the latter retains control and holds said clutch member out of engagement with another actuation of the parts whereby the arm 129 is moved out of action. The clutch is shown as closed in Fig. 18.

In the single revolution of the main shaft received as above set forth an eccentric 140, mounted on the main shaft, raises a vertical rod 141, supported upon the strap of the eccentric and having its upper end bent at right angles and provided with a depending link 142 and connecting it to an arm 143, projecting from a sleeve 144, mounted upon a stationary shaft or pivot 145. This sleeve is provided with an adjusting-flange 146 at its end, which abuts against a similar flange 147 upon a second sleeve 148, mounted on the same pivot and carrying two oppositely-projecting arms 149 and 150, one of which is connected by a rod 151 to the presser-controlling bar 109 of one carrier and the other of which is connected by a rod 152 to the presser-controlling bar of the other carrier. The adjusting-flanges are bolted together by the bolt 153, and to permit the adjusting of one flange relative to the other the flanges are provided with crossed or X-shaped slots, as shown, which give the range of adjustment needed in timing the releasing of the bars. The mechanism described is adapted to reverse the inclination of the roller-frames of both carriers by imparting longitudinal movements to the controlling-bars 109 through the arm 149 and 150, and thereby to relieve the united board from pressure, so that the kicker or ejector 160 may act and throw it out of the machine. Of course the pressers and their controlling-bars and the intervening parts return to normal position with the return of the eccentric to its starting position, so that the pressers are then in readiness to act upon the next pieces of stock.

It is frequently desirable when working short stock to prevent the lifting of such of the central pressers as do not bear upon it at the time it is ready to be ejected, and to enable this to be done I provide upon one of the side plates of each series thereof a notched plate or bar 154. (Seen clearly at Figs. 5 and 7.) The pressers which are to be rendered inactive so far as the lifting is concerned are detached from their controlling-bar 109, and their bolts 108 are inserted in the slots of the bar 154 with the pressers reversed from their normal positions. Until they are again connected to bar 109 they are not releasable, but continue to press on the stock as it passes them.

The kicker (shown at 160) is secured at one end to a vertical pivot 161, Fig. 2, and this pivot is confined in a suitable bearing and provided with an encircling spring 162, the tension of which tends constantly to turn the pivot in the proper direction for ejecting the united boards. The kicker bears against the edge of the stock. It normally lies across the path of the incoming stock upon the adjacent carrier, so that the stock as it enters forces the kicker to the position of Fig. 11, and thereby tightens the spring and puts it into condition to operate as soon as the boards have been united and released from the pressers.

The dovetail-cutters are shown at 170, a pair of them, inclined oppositely to each other, being employed to cut the dovetails on each piece of stock. They are mounted on arbors 171, and the arbors are supported in frames 172, there being one of these frames for each pair, and each frame is supported by and adjusted upon a screw 173, so that both cutters operating upon the same stock can be given any vertical adjustment needed without affecting their relation to each other in any way. That portion of the frames 172 which encircles the arbors is made in pipe form 174, partially cut away at one side and between its ends to admit the belt to the pulley 175. The arbor is arranged eccentrically in this pipe and provided with surrounding cylinders 176 at the top and 177 at the bottom, both cast in one piece with the main pipe 174. In the top bearing 176 I insert a bushing 178, which is fitted to the arbor and conforms to its taper, as plainly shown. The upper portion of this bushing is threaded and engages threads on the inner surface of the bearing 176, and its upper end is provided with a notched flange 179, whereby it may be turned by a considerable wrench, and a locking device or clip 180 is inserted in one of the notches of the flange after the bushing has been properly adjusted. This bushing is raised or lowered from time to time, as required, and in order that it may be lubricated I form an annular groove 181 in it, the vertical dimensions of which permit it to retain its registration with the feed-pipe 182 of the grease-cup 183. Openings 184, of which there is usually a plurality in the bushing, admit the lubricant to the arbor. The arbor is preferably grooved vertically in both directions from the annular groove 181, such grooves forming feed-passages adapted to carry the lubricant to the ends of the bearing. The lower bearing is also provided with a bushing 185, which also conforms to the taper of the arbor and which is threaded at its upper end in the top of the bearing. It is also provided with a notched flange 186, whereby it may be turned. This bushing may be raised or lowered in the same way as the bushing of the upper bearing. At its lower end the arbor is provided with a threaded point upon which is secured a nut 187, and surrounding this point and nut is a cap 188, its top extending over the nut, and in this cap is entered a threaded plug 189.

Between the top of the plug and the nut 187 is inserted a wear-plate 190. The plug is locked by a nut 191. The bottom of the cap is provided with laterally-extending wings 300, whereby it is bolted to the bottom of cylinder 177. The nut 187 prevents end play of the arbor, and it is made thin in order that its thickness may be affected but little by the expansion due to heat in running and its action upon the arbor be practically uniform and unchanged by the heat. The lubricant for this lower bearing comes from the grease-cup 192 through the pipe 193, which is led into the bottom of the plug 189. Both the plug and the wear-plate are provided with central openings or passages for the grease, and the top of the wear-plate is provided with horizontal grooves 194, by which the grease is carried to the vertical passages 195 through the nut 187 and from thence finds its way into the passages 196, 197, and 198.

Not only is the frame 172 vertically adjustable, but the pipe 174 is longitudinally adjustable in the frame. It rests, as will be seen at Fig. 28, upon a centrally-located screw 199, and this screw may be moved up or down and may be passed through the lower part of the frame and through the nuts 200 both above and below the frame. In this manner each item may be adjusted vertically independently of the other arbor.

A short adjustment I obtain by turning the pipe 174 in the frame. To effect and retain this adjustment, I provide on the outside pipe 174 a ring 201, which is split and has one end turned down, as shown at 202. The ends of the ring may be bolted together by the bolt 204. Upon the surrounding part of the frame 172 I mount adjusting-screws 205 and 206, both of which bear upon the turned-out end of the ring. The surrounding portion of the frame is also split and adapted to be tightened upon the pipe 174 by the screw 207. Whenever the pipe needs to be turned on its axis or to be adjusted vertically by the screw 199, this screw 207 is loosened and then retightened after the adjustment has been effected. Inasmuch as the arbor is located eccentrically of the pipe 174, it will be seen that by turning the pipe 174 the action of the cutter may be considerably modified.

The cutters themselves are so fashioned as to avoid the formation in the stuff of the sharp angles heretofore customary at the inner corners or points of the grooves and at the corresponding parts of the tongues. I prefer to make these points or angles blunt instead of sharp and as particularly shown at Fig. 36, where the angles referred to are indicated at 211. By this change in the cutters the joint itself is improved while the parts remain perfectly interfitting, and the neck of the tongue by reason of the non-removal of much of the material heretofore cut out is strengthened; but most important of all is the fact that the changed cutters retain their sharpness and integrity much longer than when made in the old way, in which they cut the sharp angles. I also find it desirable to form the cutters so they will remove the sharp edges heretofore formed along the longitudinal edges of the groove, as shown at 212 in the same figure, so that the intervening tongues at their tops will be shaped to correspond to the bottoms of the grooves. In other words, by this feature the hitherto sharp corners of the tongues, which are also the edges of the grooves, are rendered blunt, so as to bring them into interfitting correspondence with the blunt angles or points 211 of the grooves. As the part thus cut away is very apt to sliver or break off, I avoid thereby a fruitful source of trouble.

Another feature of the invention relates to the application of the glue to the surface. After much experimenting I have devised a mechanism for applying the glue, which consists of a dished wheel 220, rotating upon an inclined axis 221 and having numerous openings 222 from its interior to its exterior. It is placed so that its lower portion is constantly in a vat of glue 223. The axis 221 is supported by an arm 224, hinged to a projecting arm 225 and pressed toward the work so as to carry the wheel against the dovetail surface by a spring 226 and a set-screw 227. The gluing-wheel is covered with canvas 228, which may be sewed together across the center of its upper surface, and the body of the wheel is preferably made of cast metal.

It sometimes happens that through improper feeding or other cause the lumber becomes lodged or caught in the machine. At such times it is desirable to relieve it from pressure to enable its removal, and to enable this to be done I provide a hand-lever 230, pivoted at 231 and extending under the eccentric lever, so that it is adapted to swing said lever without lifting it, and thereby to relieve the lumber of the pressure, and supplementing this lever 230 is a second lever 231ª, pivoted at 232 and connected at each side of the pivot to the reversing-bars of the two series of pressers. This second lever is intended to be operated after the first lever, and its purpose is to restore the parts to their normal positions.

The pinion 47, through which the carriers are driven, is loose upon shaft 46 and is connected to the drive-pulley 240, also loose upon the shaft, by a clutch, (shown at 241 in Fig. 12,) the pulley being the sliding member of the clutch. It sometimes happens that only one of the two boards will be fed to the machine, and when this board is on the side where the ejector is located it is apt to be carried beyond the ejecting-point, if it is a long board, or if it is short it may be forced beyond the ejecting-point by the following board. In order that no harm may come from this, I place a depending pivoted arm 242, supported from one of the presser-roller frames and having its lower end bent at right angles and pivoted to a link 243. This arm is adapted to be encountered by the misplaced board. The other end of the link is pivoted to an arm 244, projecting from a vertical rock-shaft 245, and this rock-shaft carries an arm 246, engaging a pin 247 in a lever 248, joined to a second lever 249, pivoted to a stationary bracket 250 and connected at its longitudinal center to the movable part of the clutch. Through this construction the swinging of the pivoted arm 242 by the lumber will cause the movable member of the clutch to shift, so that the power is withdrawn from the carriers. In order that they may be again started after the removal of the displaced lumber, the lever 248 is extended, as shown at Fig. 12, so that it may be grasped by the hand and moved in a direction which will close the clutch and restore the power.

The arm 120 is pivoted at 320 and provided with a spring 321, so that when it moves back to normal position it may ride over the stop 121. A stop or shoulder 322 limits the motion of the arm to this one direction. In cases where changes of a foot or more in the length of the stock occur the angle-iron bar 323, Fig. 3, is slid one way or the other, according as the change is a reduction or increase in the length of the stock, a distance equaling the extent of the change. In these adjustments the bar 323 carries with it the rod 324, which is attached to it by means of a bracket 325, formed on the bar. This rod 324 passes through a lug 326, attached to the slide 90, and also through the spring 95, so that it is adapted to compress said spring. When these adjustments are made, the stop 21 is also adjusted on its supporting rod or bar to a corresponding extent and in a corresponding direction.

The operation of the machine is as follows: Supposing the parts to be in motion, the carriers moving in opposite directions, and that two pieces of lumber are placed one upon each carrier simultaneously, the movement of the carriers carries the lumber first under the pressers 110, by which they are held down while undergoing operation by the dovetail-cutters, and the continued movement carries them after they are cut into engagement with each other, the tongues of one being forced into the grooves of the other. The engaging movement is stopped when the ends are even with each other, the stock itself upon one carrier, through the mechanism described, controlling the tripping of the dogs of the carrier. While the stock is being united it is held down by the releasable pressers at the center of the machine, and as soon as the union is completed these pressers are raised and the stock is ejected by the kicker 160.

The operation of the different parts of the machine has been fully detailed in the description of the parts, and their operation therefore does not need to be recapitulated.

I claim—

1. In a machine for joining lumber, oppositely-moving carriers the sections or carriages whereof are provided with normally depressed dogs for pushing the stock, in combination with automatic selecting mechanism for positioning the proper dogs for action.

2. In a machine for joining lumber, oppositely-moving carriers the sections or carriages whereof are provided with normally depressed dogs for pushing the stock, in combination with automatic selecting mechanism for positioning the proper dogs for action, and means for tripping the dogs automatically.

3. In a machine for joining lumber, a carrier for feeding the stock consisting of sections or carriages, each provided with a normally depressed feeding-dog, and selecting mechanism for raising the proper dogs.

4. In a machine for joining lumber, a carrier for feeding the stock consisting of sections or carriages, each provided with a normally depressed feeding-dog, selecting mechanism for raising the proper dogs and means for locking the dogs in the raised position.

5. In a machine for joining lumber, a carrier for feeding the stock consisting of sections or carriages, each provided with a normally depressed feeding-dog, selecting mechanism for raising the proper dogs, devices for locking the dogs in the raised position, and means for tripping the locking devices, and thereby causing the withdrawal of the dogs.

6. In a machine for joining lumber, a carrier for feeding the stock consisting of sections or carriages, each provided with a normally depressed feeding-dog, and a device for selecting the dogs to be raised, consisting of a star-wheel and means whereby the wheel may cause the raising of the dogs.

7. In a machine for joining lumber, a carrier for feeding the stock consisting of sections or carriages, each provided with a normally depressed feeding-dog, a device for selecting the dogs to be raised, and means for raising the dogs set in action by the selecting device.

8. In a machine for joining lumber, a carrier consisting of a series of carriages each having a normally depressed feeding-dog, wheels over which the carrier moves, a selecting device for selecting the dogs to be raised, and lifters carried by one of the wheels and acting to raise the selected dogs.

9. In a machine for joining lumber, a carrier consisting of a series of carriages each having a normally depressed feeding-dog, wheels over which the carrier moves, a selecting device for selecting the dogs to be raised, lifters carried by one of the wheels and acting to raise the selected dogs, and locking devices for locking the dogs in the raised position.

10. The carrier for use in joining lumber, embodying a series of short carriages linked together, wheels for operating the carrier, a series of dogs one in each carriage, a device with each dog for locking it when raised, selecting means for selecting the dogs to be raised, and lifting means for raising the selected dogs.

11. The carrier for use in joining lumber, embodying a series of short carriages linked together, wheels for operating the carrier, a series of dogs one in each carriage, a device with each dog for locking it when raised, selecting means for selecting the dogs to be raised, and lifting means for raising the selected dogs, in combination with means for releasing said locking devices.

12. The combination in a lumber-joining machine of two oppositely-moving carriers, each embodying a series of short carriages linked together, wheels for operating the carrier, a series of pushing-dogs one in each carriage, a device with each dog for locking it when raised, selecting means for selecting the dogs to be raised and lifting means for raising the selected dogs.

13. The lumber-joining machine embodying two oppositely-moving carriers for feeding the stock into engagement, both carriers having retractable feeding-dogs and means whereby one of the carriers controls the retraction of the dogs of the other carrier.

14. The lumber-joining machine embodying two oppositely-moving carriers for feeding the stock into engagement, both carriers having retractable feeding-dogs and means whereby one of the carriers controls the retraction of the dogs of the other carrier.

15. The lumber-joining machine embodying two oppositely-moving carriers for feeding the stock into engagement, both carriers having retractable feeding-dogs, means for tripping the dogs, and means whereby one carrier controls the tripping means of the other carrier.

16. The lumber-joining machine embodying two oppositely-moving carriers for feeding the stock into engagement, both carriers having retractable feeding-dogs and means for tripping the same, the tripping means of one carrier being stationary while those of the other carrier are movable and are controlled from the first carrier.

17. The lumber-joining machine embodying two oppositely-moving carriers for feeding two pieces of stock into engagement, both having retractable feeding-dogs, and means for tripping the dogs of one carrier at a predetermined time, and means for tripping the dogs of the other carrier acting when the ends of the two pieces of stock are even with each other.

18. The lumber-joining machine embodying two oppositely-moving carriers for feeding two pieces of stock into engagement, both having retractable feeding-dogs, and means for tripping the dogs of one carrier at a predetermined time, and means dependent upon the first carrier for tripping the dogs of the other carrier when the ends of the two pieces are even with each other.

19. The lumber-joining machine embodying two oppositely-moving carriers for feeding two pieces of stock into engagement, both having retractable feeding-dogs, and means for tripping the dogs of one carrier at a predetermined time, and means controlled by the first carrier for causing the tripping of the dogs of the other carrier when the ends of the two pieces are even with each other.

20. The lumber-joining machine embodying two oppositely-moving carriers provided with dogs for feeding the stock, a sliding rack-bar 90, a feeler on said bar engaged by the stock on one of the carriers, means for tripping the dogs of both carriers, and gearing connecting the bar 90 to the tripping means of one of the carriers.

21. The lumber-joining machine embodying two oppositely-moving carriers for feeding the stock into engagement, both carriers having retractable feeding-dogs and the retraction of the dogs of one of them being controlled from the other carrier, pressure devices acting on the stock while it is being joined, and means controlled from one of the carriers for causing the release of the pressure devices.

22. The combination with the carriers of the pressers consisting of the rollers, the inclined pivoted roller-frames, the springs acting on the frames and the reversible levers for controlling the springs.

23. The combination with the carriers of the pressers consisting of the rollers, the inclined pivoted roller-frames, the springs acting on the frames, the reversible levers for controlling the springs, and the horizontal bar for reversing the levers.

24. The combination with the carriers of the pressers consisting of the rollers, the inclined pivoted roller-frames, the springs acting on the frames, the reversible levers for controlling the springs, the horizontal bar for reversing the lever, power devices for actuating said bar and means whereby one of the carriers controls said power devices.

25. The combination with the oppositely-moving carriers, of pressers for holding the stock upon the carriers while it is being joined, power devices for effecting the release of the pressers, and means whereby the operation of said power devices may be controlled by the stock upon one of the carriers.

26. The combination with oppositely-moving carriers, of a series of pressers over each carrier bearing upon the stock while it is being joined, and automatic means for causing the release of the joined stock from the pressers preparatory to its ejection, said pressers being adapted to be disconnected from the releasing means.

27. The combination with the oppositely-moving carriers, of automatically-releasable pressers for holding the stock on the carriers while it is being joined, and means for releasing the stock from said pressers at will in case of lodging lumber or clogging of the machine.

28. The combination with the carrier, of a pair of rapidly-rotating cutters for cutting the dovetails in a piece of stock moved by the carrier, a supporting-frame for the cutters which is vertically adjustable, and means in the frame for adjusting the cutters at right angles to their arbors.

29. The combination with the carrier, of a pair of rapidly-rotating cutters for cutting the dovetails in a piece of stock moved by the carrier, a supporting-frame for the cutters which is vertically adjustable, and a cylindrical housing for the arbor of each cutter adapted to be turned on its axis, the arbors being eccentrically located in the housings.

30. The combination with the carrier, of a pair of rapidly-rotating cutters for cutting the dovetails in a piece of stock moved by the carrier, a supporting-frame for the cutters which is vertically adjustable and a cylindrical housing for the arbor of each cutter, adapted to be turned on its axis, the housings being mounted in said frame and effecting the adjustment of the arbors at right angles to the axes of the latter by a turning movement of the housings.

31. The combination with the carrier, of a pair of rapidly-rotating cutters for cutting the dovetails in a piece of stock carried by the carrier, a separate casing for the arbor of each cutter in which it is eccentrically located, such casings being adapted to be turned independently to effect adjustment of the arbors relative to the stock, and each arbor being also independently adjustable in the direction of its length.

32. In a dovetailing-machine, a rapidly-rotating cutter mounted upon an inclined arbor, said arbor having its bearings located eccentrically in a cylindrical casing capable of a turning adjustment.

33. In a dovetailing-machine, the combination of companion dovetail-cutters, mounted upon oppositely-inclined arbors, and each arbor having its bearings located eccentrically in a cylindrical casing capable of a turning adjustment.

34. The combination with the inclined arbor of a rapidly-rotating dovetail-cutter, of a cylindrical casing 174, a support for the casing and in which it has a turning adjustment, and bearings for the arbor located in said casing and eccentrically of its axis.

35. The combination with the oppositely-moving carriers and automatically-releasable pressers, of a spring-actuated ejecting device consisting of an arm lying normally in the path of, and positioned for action by the lumber.

36. The combination with the carriers and the pressers, of a spring-actuated ejecting device consisting of an arm lying normally in the path of, and positioned for action by the lumber, the device being mounted on a vertical pivot and having a spring for turning the pivot.

37. The combination with the oppositely-moving carriers, of the ejector, and means for stopping the carriers adapted to be set in operation by any stock on one of the carriers which moves beyond the ejector without being ejected.

38. The combination with the oppositely-moving carriers, an ejector, actuating means whereby the carriers are driven and embodying a clutch, of a gate over one of the carriers adapted to be operated by any stock on that carrier in case it moves beyond the ejector, and connections between said gate and said clutch serving when the gate is operated to open the clutch.

39. The combination with the oppositely-moving carriers, the ejector, and the power mechanism for driving the carriers, of a clutch connection between said power mechanism and the carriers, and means for opening the clutch set in operation by stock which may pass the ejector without being thrown out thereby.

ALBERT T. LINDERMAN.

Witnesses:
H. M. MUNDAY,
EDW. S. EVARTS.